INVENTOR.
John R. Scheder
BY
Howard G. Russell
his ATTORNEY

United States Patent Office 3,595,769
Patented July 27, 1971

3,595,769
PREVENTION OF CALCIUM PRECIPITATION IN THE ELECTRODIALYTIC DEMINERALIZATION OF WHEY
John R. Scheder, Horicon, Wis., assignor to Purity Electrochemical Company, Mayville, Wis.
Filed Feb. 27, 1969, Ser. No. 803,015
Int. Cl. B01d 13/02
U.S. Cl. 204—180P                                     2 Claims

ABSTRACT OF THE DISCLOSURE

Whey is demineralized in a multichamber electrodialysis cell comprising cation membranes and neutral membranes in alternating sequence.

Figure 1:
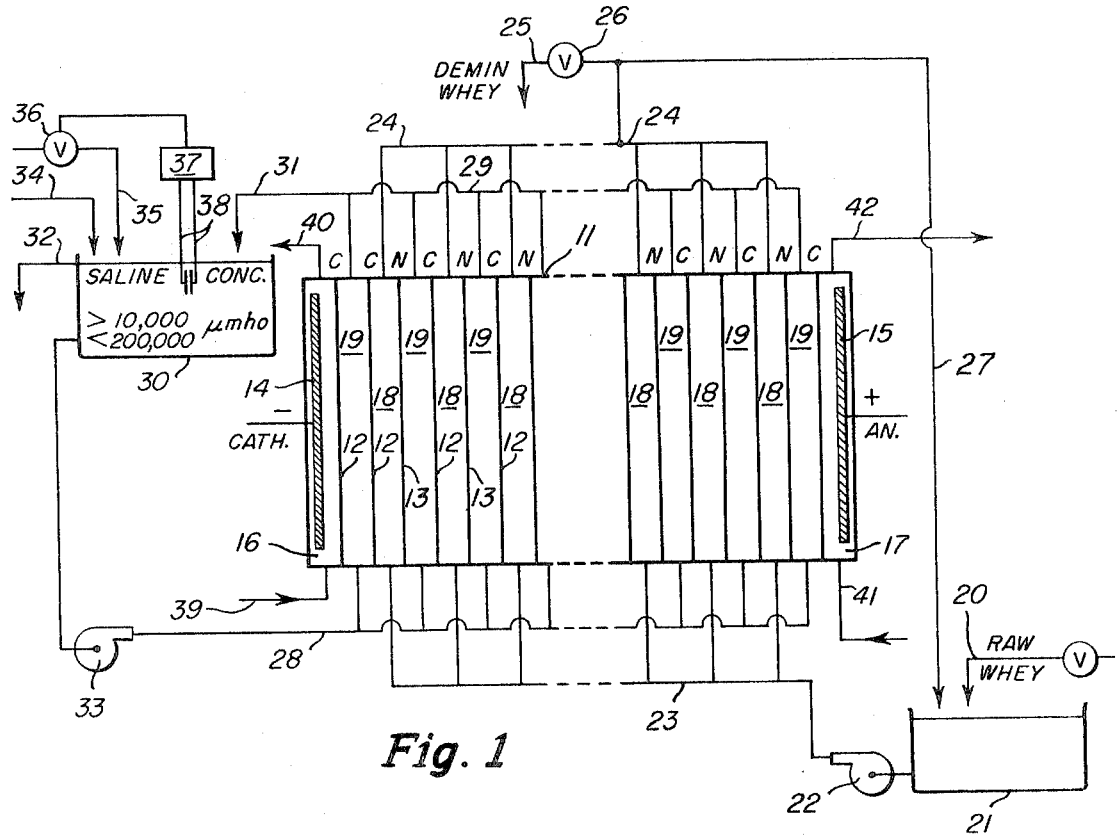

Calcium precipitation on the neutral membrane face in the whey stream is found to be related to the electrical conductivity of the adjacent salt stream, and a critical conductivity range is determined within which the productivity loss is at a minimum, including an optimum conductivity value at which productivity loss due to such calcium precipitation is practically zero.

---

This invention provides improvements in the method, process and apparatus for the demineralization of whey by electrodialysis.

More specifically, the invention is directed to the prevention of calcium precipitation in the whey stream, particularly on neutral membranes bordering the whey demineralizing chambers of a multichamber cell comprising cation-permeable, anion-passage-resistant first membranes, and neutral second membranes in alternating sequence.

This membrane arrangement produces, between terminal electrodes, a plurality of deionizing chambers and concentrating chambers following one another in alternating sequence.

The particular combination of cation membranes and neutral membranes, cellophane being an example of the latter, has the peculiarity of permitting, in the absence of other ion passage controlling conditions, passage of cations through a plurality of successive whey streams and concentrating streams therebetween.

The concentrating streams are streams of an electrolyte solution into which ions of the raw whey, for example salt ions, are transferred under the action of a direct electrical potential applied to the electrodes.

The aforesaid method of demineralizing whey is disclosed in my copending patent applications Ser. No. 802,766, filed Feb. 27, 1969, Ser. No. 803,014, filed Feb. 27, 1969, and Ser. No. 802,848, filed Feb. 27, 1969, and represents an improvement over a known method practiced, as far as I am aware, on a laboratory scale and employing anion selective membranes and cation selective membranes in alternating sequence.

It has been observed that, for the practice of electrodialytic demineralization of whey on a commercial scale, the combination of anion membranes with cation membranes leads to operational difficulties in the nature of clogging, polarization, and a relatively short life span of the anion membranes of the electrodialysis cell.

The use of neutral membranes in place of anion membranes results not only in certain advantages, but also in a non-equivalent operation in relation to the known cell comprising anion membranes and cation membranes, inasmuch as cations are not barred at intervals by anion selective membranes but may, and do, pass through successive whey streams and concentrating streams.

My above identified patent applications deal with particular measures for the control of certain phenomena resulting from such cation passage and from other causes.

One of the difficulties encountered in the demineralization of whey by electrodialysis is the precipitation of calcium. The problem of calcium is complex in that calcium may precipitate in different portions of the cell as a result of distinct causes.

My copending patent application Ser. No. 802,848, filed Feb. 27, 1969, deals with the prevention of calcium precipitation in the concentrating streams, particularly on the face of the cation membranes swept by the concentrating stream.

My observations lead me to conclude that a different cause or causes are responsible for a precipitation of calcium in the whey stream, particularly on the face of the neutral membrane swept by the whey stream, and that the latter phenomenon is essentially unrelated to calcium precipitation in the concentrate stream. At any rate, either form of calcium precipitation can experimentally be provoked independently of the other.

In the study of these phenomena, I discovered that the calcium precipitation on the face of the neutral membrane and within the whey stream responds to changes in the conductivity of the adjacent concentrate stream, and not, as one should expect, to a variable of the whey stream itself.

Accordingly, the method of demineralizing a solution stream, containing whey protein and other whey constituents, which method comprises the flowing of said stream through deionization chambers of an electrodialysis apparatus comprising deionizing chambers and concentrating chambers defined between a plurality of spaced alternatingly disposed hydraulically substantially impermeable membranes of two kinds, the one kind being selectively permeable to cations and passage resistant to anions, the membranes of the other kind being substantially neutral; flowing an electrolyte solution as a concentrating stream through the chambers lying between said deionization chambers; applying at terminal electrodes a direct electric current in series across said membranes and the chambers defined between them, the polarity being such as to cause anions in the whey stream to migrate away from the respective cation membranes, which cation membranes are anion passage resistant, said electrodes being disposed in electrode chambers; and passing electrolyte through said electrode chambers is improved according to this invention by maintaining the conductivity of the concentrating stream at no less than 10,000 μmho and not more than 200,000 μmho.

A particularly advantageous operating condition exists at approximately 50,000 μmho.

The various objects, features and advantages of this invention will appear more fully from the detailed description which follows accompanied by drawings showing, for the purpose of illustration, a representative cell arrangement for the practice of this invention.

Although the characteristic features of the invention which are believed to be novel will be particularly pointed out in the appended claims, the invention, its objects and advantages, and the manner in which it may be carried out may be better understood by referring to the following description taken in connection with the accompanying drawings forming a part of this disclosure.

Figure 2:
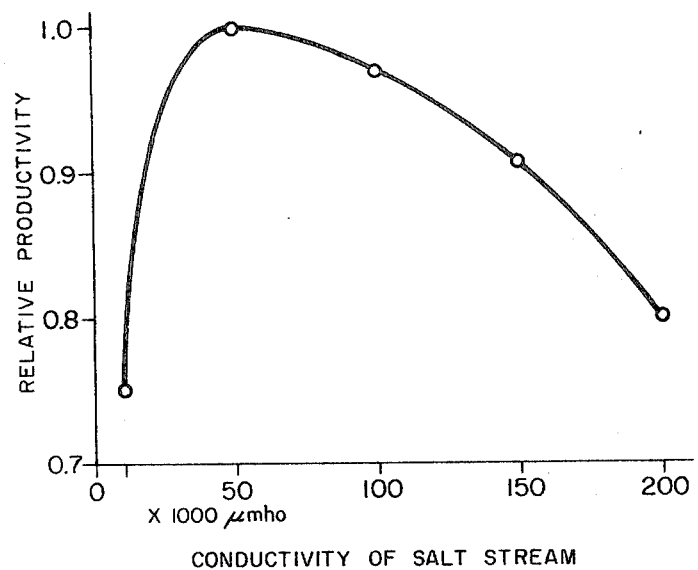

FIG. 1 is a diagrammatic illustration of a representative whey demineralizing cell for the practice of the present invention; and FIG. 2 is a graph showing relative production as a function of conductivity.

In the following description and in the claims various details will be identified by specific names for convenience. The names, however, are intended to be generic in their application.

The accompanying drawings disclose certain details for the purpose of explanation of broader aspects of the invention, but it should be understood that certain structural details may be modified in various respects without departure from the principles of the invention, and that the invention may be incorporated in, and practiced by, structurally different cell systems than shown.

The electrodialylsis cell 11 comprises alternatingly arranged cation-permeable, anion-passage-resistant membranes 12 of ion exchange material and neutral membranes 13, cellophane being a representative example of the latter.

Electrodes 14 and 15 are mounted in terminal electrode chambers 16 and 17, electrode 14 being connected to a source (not shown) of negative direct potential, which makes it a cathode, and electrode 15 being connected to a source of positive direct potential, which makes it an anode.

In the illustrated arrangement of membranes and electrodes every other chamber, excluding the electrode chambers, becomes a deionization chamber 18, and the chambers 19 therebetween become concentrating chambers.

Whey to be demineralized is passed through the chambers 18 causing anionic and cationic components to migrate out of the whey through the bordering membranes under the influence of the electrical potential, the movement of the ions resulting in an electric current flowing through the cell from electrode to electrode.

Whey to be demineralized enters the apparatus through a supply duct 20 and flows into a tank 21 whence it is withdrawn by a pump 22 which feeds it into a manifold 23 and thence into the whey chambers 18.

Deionized whey flows from the deionizing chambers 18 into a collecting manifold 24. A portion of the product may be withdrawn through a product duct 25 controlled by a valve 26, the balance being returned to the tank 21 by a return duct 27.

In order to maintain the whey level constant in the tank 21, the whey supply through the duct 20 must match the withdrawal through the duct 25.

A suitable electrolyte, for example sodium chloride, is fed into the concentrating chambers 19 through a supply manifold 28 and ion enriched saline solution is withdrawn from the chambers 19 through a collecting manifold 29 into a concentrate tank 30 by means of a duct 31. The liquid level in the tank 30 is maintained constant by an overflow duct 32.

A pump 33 withdraws liquid from the tank 30 and feeds it into a supply manifold 28. The tank 30 is originally filled through a duct 34 and water is admitted through a duct 35 controlled by a valve 36. The valve, in turn, is controlled by a conductivity meter 37 whose electrodes 38 dip into the saline concentrate in the tank.

For reasons hereinafter more fully explained, the conductivity meter maintains, by the controlled admission of water, the conductivity of the saline solution which is about to be recirculated through the concentrating chambers 19 at a present level higher than 10,000 $\mu$mho per cm. and less than 200,000 $\mu$mho per cm., preferably about 50,000 $\mu$mho per cm.

Electrolyte is passed through the electrode chambers 16 and 17 and through ducts 39, 40, 41 and 42.

EXAMPLE

The whey to be demineralized contained 40 percent solids and 60 percent water. The solids comprised approximately 20 percent minerals, 22 percent protein, 45 percent lactose and a balance of carbohydrates, citrates and other constituents. The pH of the whey was 7.0.

The whey was demineralized in a commercial size electrodialysis cell containing a total of 100 chambers.

Normal operating current 90 amps.

Normal starting potential 185 v.

A voltage regulator was employed for the purpose of maintaining the current at 90 amps. by increase of the potential to compensate for an increase of the ohmic cell resistance. The maximum to which the potential could be raised was 230 v.

Relative production was ascertained as a function of conductivity of the salt stream in terms of $\mu$mho per cm.

Peak production at the most favorable conductivity was taken as 1.0 and the production at other conductivities was determined in relation thereto. A relative production figure of 0.8 indicates a 20 percent drop in production in relation to the optimum.

| Conductivity of salt stream $\mu$mho per cm.: | Relative production |
|---|---|
| 10,000 | 0.75 |
| 50,000 | 1.0 |
| 100,000 | 0.97 |
| 150,000 | 0.91 |
| 200,000 | 0.80 |

The figures were determined at the 20th hour of operation of the cell and are plotted in FIG. 2.

After termination of the respective demineralization runs the cell was disassembled. When operated at a conductivity of the salt stream at 50,000 $\mu$mho per cm. no calcium precipitation was found on the neutral membrane face. When operated at 10,000 $\mu$mho per cm. a heavy calcium phosphate deposit was found.

Conclusion: On the basis of the above figures, operation between 10,000 $\mu$mho and 200,000 $\mu$mho represents operation at efficiencies of 80 percent and greater of the obtainable optimum which occurred at 50,000 $\mu$mho. Operation outside the stated limits is not only commercially uneconomical but technically difficult and impractical for the reasons that (a) heavy precipitate accumulates and must be removed, (b) the corresponding drop in conductivity leads to the need for higher and higher potential in order to maintain the current constant. For example, below 10,000 $\mu$mho the maximum available potential of 230 v., constituting an increase of 45 v. over the starting voltage, was reached and it was technically not practicable to increase the potential further.

What is claimed is:

1. In the method of demineralizing a solution stream containing whey protein and other whey constituents, which method comprises the flowing of said stream through deionization chambers of an electrodialysis apparatus comprising deionizing chambers and concentrating chambers defined between a plurality of spaced alternatingly disposed hydraulically substantially impermeable membranes of two kinds, the one kind being selectively permeable to cations and passage resistant to anions, the membranes of the other kind being substantially neutral; flowing an electrolyte solution as a concentrating stream through the chambers lying between said deionization chambers; applying at terminal electrodes a direct electric current in series across said membranes and the chambers defined between them, the polarity being such as to cause anions in the whey stream to migrate away from the respective cation membranes, which cation membranes are anion passage resistant, said electrodes being disposed in electrode chambers; and passing electrolyte through said electrode chambers, the improvement of minimizing the precipitation in the whey stream of calcium, more particularly calcium phosphate, on the face of the neutral membranes bordering the whey stream, said improvement comprising maintaining the conductivity of the said concentrating stream at at least 10,000 μmho per cm. and at less than 200,000 μmho per cm.

2. The method according to claim 1 in which the conductivity of the concentrating stream is maintained substantially at 50,000 μmho per cm.

References Cited

UNITED STATES PATENTS

| | | | |
|---|---|---|---|
| 1,022,523 | 4/1912 | Whitney | 204—180P |
| 2,631,100 | 3/1953 | Aten et al. | 99—57 |
| 2,758,965 | 8/1956 | Block et al. | 204—180P |
| 2,848,403 | 8/1958 | Rosenberg | 204—180P |
| 2,872,407 | 2/1959 | Kollsman | 204—301 |
| 3,166,486 | 1/1965 | Hull | 204—180P |
| 3,325,389 | 6/1967 | Parsi et al. | 204—180P |
| 3,369,906 | 2/1968 | Chen | 99—77 |
| 3,440,159 | 4/1969 | McRae et al. | 204—180P |
| 3,484,356 | 12/1969 | Goujard | 204—180P |

JOHN H. MACK, Primary Examiner

A. C. PRESCOTT, Assistant Examiner

U.S. Cl. X.R.

99—57